United States Patent [19]

Zhang et al.

[11] Patent Number: 5,732,697
[45] Date of Patent: Mar. 31, 1998

[54] SHIFT-INVARIANT ARTIFICIAL NEURAL NETWORK FOR COMPUTERIZED DETECTION OF CLUSTERED MICROCALCIFICATIONS IN MAMMOGRAPHY

[75] Inventors: Wei Zhang, Mountain View, Calif.; Kunio Doi, Willowbrook, Ill.

[73] Assignee: ARCH Development Corporation, Chicago, Ill.

[21] Appl. No.: 562,188

[22] Filed: Nov. 22, 1995

[51] Int. Cl.$^6$ .................... A61B 5/00; A61B 5/05
[52] U.S. Cl. .................... 128/630; 128/653.1
[58] Field of Search .................... 128/630, 653.1, 128/920, 922–924; 382/156–161

[56] References Cited

U.S. PATENT DOCUMENTS

| | | | |
|---|---|---|---|
| 5,260,871 | 11/1993 | Golberg | 128/922 |
| 5,463,548 | 10/1995 | Asada et al. | 128/924 |
| 5,491,627 | 2/1996 | Zhang et al. | 128/924 |

OTHER PUBLICATIONS

Zhang et al., "Computerized detection of clustered microcalcifications in digital mammograms using shift-invariant artificial neural network" Medical Physics, vol. 21, No. 4, pp. 517–524, Apr. 1994.

Chan et al., "Computer-aided detection of mammographic microcalcifications: Pattern recognition with an artificial neural network", Medical Physics vol. 22, No. 10, pp. 1555–1567, Oct. 1995.

Wu et al., "Application of artificial neural networks in mammography for the diagnosis of breast cancer", SPIE vol. 1778 Imaging Technologies and Applications, pp. 19–27, 1992.

Wu et al., "Computerized detection of clustered microcalcifications in digital mammograms: Applications of artificial neural networks", Medical Physics, vol. 19, No. 3. pp. 555–560, Jun. 1992.

*Primary Examiner*—Jennifer Bahr
*Assistant Examiner*—Samuel Gilbert
*Attorney, Agent, or Firm*—Oblon, Spivak, McClelland, Maier & Neustadt, P.C.

[57] ABSTRACT

A computerized method and system using a shift-invariant artificial neural network (SIANN) for the quantitative analysis of image data. A series of digitized medical images are used to train an artificial neural network to differentiate between diseased and normal tissue. The sum of the weights in groups between layers is constrained to be substantially zero so as to avoid saturation of layers which would otherwise be saturated by low frequency background noise. The method and system also include utilizing training-free zones to exclude from training the center portions of microcalcifications in the digitized images. The method and system further include rule-based selection criteria for providing a more accurate diagnosis.

90 Claims, 7 Drawing Sheets

SHIFT-INVARIANT ARTIFICIAL NEURAL NETWORK FOR COMPUTERIZED DETECTION OF CLUSTERED MICROCALCIFICATIONS IN MAMMOGRAPHY

The present invention was made in part with U.S. Government support under NIH grants/contracts CA24806 and CA48985 and U.S. Army Medical Research and Development Command grand DAMD 17-93-J 3021. The U.S. Government has certain rights in the invention.

CROSS-REFERENCE TO RELATED CO-PENDING APPLICATIONS

Ser. No. 08/060,531, filed May 13, 1993, entitled "Method and System for the Detection of Microcalcifications in Digital Mammograms" is concerned with using digital mammograms which are preprocessed using background-trend correction and pixel-valve normalization as an input to a neural network.

BACKGROUND OF THE INVENTION

1. Field of the Invention

This invention relates to a method of using a neural network to diagnose medical conditions from medical images.

2. Discussion of the Background

Computer-aided diagnosis of diseases is an important subject in radiology. Breast cancer causes 44,000 deaths per year in the United States, and mammography has been proven to be the primary diagnostic procedure for the early detection of breast cancer. Between 30 and 50% of breast carcinomas demonstrate microcalcifications on mammograms and between 60% and 80% of the carcinomas reveal microcalcifications upon histologic examination. Therefore, clustered microcalcifications in mammograms are an important sign in the detection of breast carcinoma.

Computer-aided diagnosis (CAD) schemes, such as disclosed in Chan, H. P. et al., "Improvements in radiologists' detection of clustered microcalcifications on mammograms: The potential of computer-aided diagnosis," Invest. Radiol. 25, 1102–1111 (1990), and Nishikawa, R. M., et al., "Automated detection of microcalcification in mammograms: New feature-extraction techniques using morphologic filters," Medical and Biological Engineering and Computing, (accepted 1993), incorporated herein by reference, based on filtering and feature extraction have been implemented, but such systems proved inadequate for eliminating false positive detections. The CAD scheme identifies small regions of potential clustered microcalcifications that are then indicated on the digitized mammogram. In an analysis of 78 mammograms, 85% of the true clusters were detected with 1.5 false-positive detections per image. Although it is desirable to improve the sensitivity of a system to detect all the true positives, this often results in an increase in false-positive detection and, therefore, a decrease in specificity.

Neural networks have also been proposed as useful in diagnosing medical conditions and processing images because of neural networks' ability to learn from training examples and their ability to create accurate non-linear responses which are capable of operating correctly in the presence of noisy signals and missing data. Neural networks are described in general in "Artificial Neural Networks: Concepts and Theory" by Pankaj Mehra and Benjamin W. Wah, incorporated herein by reference. The use of neural networks for image processing is described in U.S. Pat. No. 4,941,122 to Weideman, and methods of training neural networks are described in U.S. Pat. No. 4,912,647 to Wood and in "Learning Internal Representations by Error Propagation", Chapter 8 of "Parallel Distributed Processing", Rumelhart, Hinton, and Williams, MIT Press, Cambridge, Mass., 1986. These patents and "Parallel Distributed Processing" are incorporated herein by reference.

To overcome the problems of the computer-aided diagnosis systems and neural networks alone, CAD systems were coupled with artificial neural networks, as discussed in Zhang, W., et al., "Computerized detection of clustered microcalcifications in digital mammograms using a shift-invariant artificial neural network," Med. Phys. 21, 517–524 (1994), incorporated herein by reference, and hereinafter "Computerized detection of clustered microcalcifications." This is also the subject matter of co-pending related application Ser. No. 08/060,531, which is also incorporated herein by reference. Regions of interests (ROIs) indicated by a CAD system were first preprocessed with background-trend correction and pixel-value normalization, and were then entered into a shift-invariant artificial neural network. The SIANN was trained to detect each individual microcalcification in a given ROI, and an ROI was classified as a positive ROI if the total number of microcalcifications detected in the ROI was greater than a certain number. This combination was able to eliminate about 55% of the false-positive clusters without any loss of the true positive clusters detected by the previous rule-based CAD system. Although this combination performs better than a CAD system alone, the accuracy of the system is related to the area across which microcalcifications occur in an image and the size of the region of interest input to the SIANN during training. Furthermore, errors are introduced when the ROI size is different in testing than was used in training.

SUMMARY OF THE INVENTION

It is an object of the present invention to provide an improved method for detecting diseases in digital images which overcomes the above and other deficiencies.

It is a further object of the present invention to provide a shift-invariant artificial neural network to provide computerized detection of diseased tissue.

It is yet a further object of the present invention to provide a shift-invariant artificial neural network which is trained using training images and desired outputs and using a zero-mean-weight constraint for connection weights into any group of neurons.

It is yet another object of the present invention to provide a novel method of training a shift-invariant artificial neural network to detect diseased tissue by using "training-free zones" during training.

It is a further object of the present invention to provide a cross-validation training technique which is based on the receiver operating characteristics (ROC) analysis of the performance of the shift-invariant artificial neural network to avoid overtraining the neural network.

It is an additional object of the present invention to provide a shift-invariant neural network which is trained using training images, desired outputs and zero-mean connection weights, which outputs a filtered image which is subsequently split into regions and analyzed to extract candidate regions as either diseased tissue or healthy tissue by discarding candidate regions elements larger than a preset threshold size or having a linearity greater than preset threshold, and determining if a remaining number of candidate regions is greater than a preset threshold.

The above objects are achieved by a method and a system according to a first embodiment of the present invention, by obtaining training digitized mammograms and desired outputs for training a shift-invariant neural network, the shift-invariant neural network, including an input layer, at least one hidden layer and an output layer, wherein the output layer contains at least one neuron, each hidden layer includes at least one hidden group, each with at least one hidden unit containing at least one neuron, training using an error back propagation algorithm that constrains the mean of the weights of each group to be substantially zero and which requires that the connection weights of each neuron between two groups in adjacent layers be identical, obtaining patient digitized mammograms, extracting regions of interests in the patient digitized mammograms suspected of containing microcalcifications, converting the regions of interests into numerical data, inputting the numerical data into the trained neural network, outputting a filtered image and detecting microcalcifications using the output images.

The system according to the first embodiment for detecting microcalcifications in a digital mammogram includes a shift-invariant neural network, means for obtaining a digitized training mammogram, a detector connected to this device to detect suspected microcalcifications in the digital mammogram, means for extracting plural training regions of interest from the digitized mammogram corresponding to the suspected microcalcifications, a region of interest processing device, an input data scaler for scaling the processed region of interest, means for training the shift-invariant neural network using the numerically scaled regions of interest and outputs corresponding output images, and a means for detecting microcalcifications using the shift-invariant neural network.

The above objects also are achieved by a method and a system according to a second embodiment of the present invention, by obtaining training digitized mammograms and desired outputs including regions indicated as training-free zones for training a shift-invariant neural network, the shift-invariant neural network, including an input layer, at least one hidden layer and an output layer, wherein the output layer contains at least one neuron, each hidden layer includes at least one hidden group, each with at least one hidden unit containing at least one neuron, training using an error back propagation algorithm that constrains the mean of the weights of each group to be substantially zero and which requires that the connection weights of each neuron between two groups in adjacent layers be identical, obtaining patient digitized mammograms, extracting regions of interests in the patient digitized mammograms suspected of containing microcalcifications, converting the regions of interests into numerical data, inputting the numerical data into the trained neural network, outputting a filtered image and detecting microcalcifications using the output images.

The system according to the second embodiment for detecting microcalcifications in a digital mammogram includes a shift-invariant neural network, means for obtaining a digitized training mammogram, a detector connected to this device to detect suspected microcalcifications in the digital mammogram, means for extracting plural training regions of interest from the digitized mammogram corresponding to the suspected microcalcifications, a region of interest processing device, an input data scaler for scaling the processed region of interest, means for training the shift-invariant neural network using the numerically scaled regions of interest, including means for designating training-free zones, and outputs corresponding output images, and a means for detecting microcalcifications using the shift-invariant neural network.

The present invention performs computer-aided diagnosis using shift-invariant artificial neural networks, and more in particular, computer-aided diagnosis using a shift-invariant artificial neural network trained using zero-mean-weight constraints with or without training-free zones to analyze mammographic data to detect clustered microcalcifications in digital mammogram images. Because it was found that the area in which clustered microcalcifications occur varies from 30 to 200 pixels (3 to 20 mm), the present invention can use different ROI sizes for the SIANN analysis, i.e., small ROI for small clusters and large ROI for large clusters.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
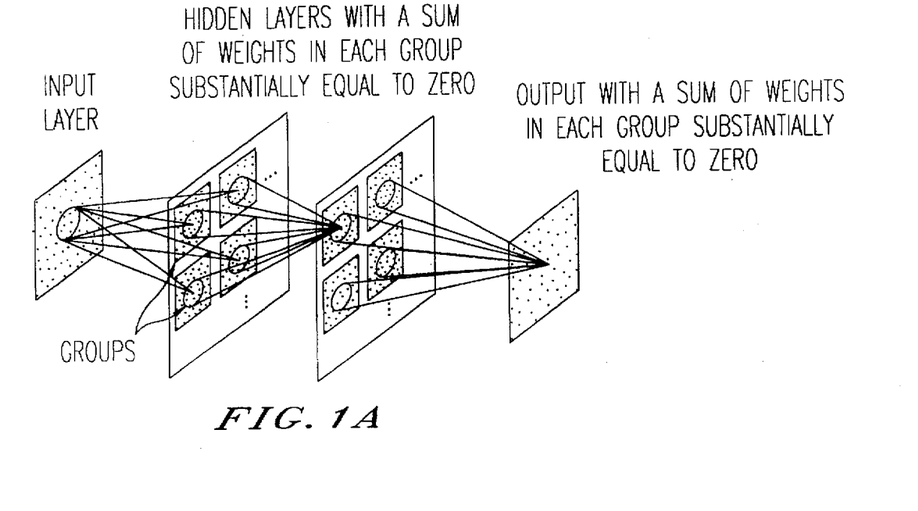
FIG. 1A is a layered diagram of a neural network.

Referring now to the drawings, wherein like reference numerals designate identical or corresponding parts throughout the several views, FIG. 1 is a view showing the overall layout of a feed forward neural network including an input layer, two hidden layers and an output layer. Each of the two hidden layers contains multiple groups, with four groups shown in each hidden layer. The output layer and each of the groups in the hidden layers contain multiple neural network units, wherein each unit receives inputs from preceding layers, multiplies the values of the inputs by corresponding connection weights, sums the products to create a weighted average and applies the weighted average along with a unit bias to a non-linear function to calculate the output value of the unit.

Figure 1B:
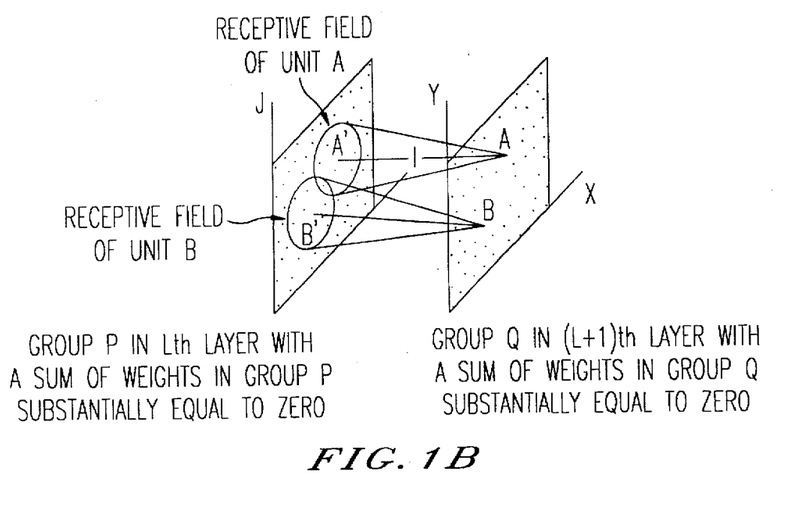
FIG. 1B is a layered diagram showing the shift invariant connections between two adjacent layers according to an embodiment of this invention.

As an example of the connections between groups in adjacent layers, FIG. 1B shows units a and b in the (l+1)th layer receiving inputs from respective receptive fields of the lth layer. To obtain shift-invariant responses, connection weights for inputs to neurons in one group from a group in a preceding layer are constrained to be identical. In general, if W(i, j; x, y) denotes the connection weight between the unit at the location (i, j) in the preceding layer and the unit (x, y) in the subsequent layer, the shift-invariant connection weights can be formulated as follows:

$$W(i,j; x,y) = W(i-x, j-y) \tag{1}$$

Thus, the connection weights between each of the two groups can be considered as a convolutional kernel or filter, and the SIANN can be considered as a multi-layered, multi-channeled, non-linear filter bank, in which all filters are designed by training. In the case of multigroup and multilayer neural networks as shown in FIG. 1A, units in the same layer but belonging to different groups have the same size receptive fields, but different patterns of connection weights. To avoid the effects of the edges in the input images, the number of units in each group of subsequent layer is reduced depending on the size of the receptive field. Assume that the number of the units of a group in the Lth layer is N×N and the receptive field size l+1th layer is M×M, the number of the units of the group in the l+1th layer should be (N−M+1×N−M+1).

These weights are used to compute the output of each unit in each group and in the output layer by multiplying each weight with a corresponding input, summing each of the products of the weights and their corresponding inputs, optionally adding a threshold to the calculated sum and applying the result to a chosen non-linear function. For illustrative purposes, a bi-polar sigmoid-like function is used as an activation function of the processing unit. The bi-polar sigmoid-like function is given by:

$$f(x) = \frac{2}{1 + \exp(-x)} - 1. \tag{2}$$

However, other functions can be used as long as they are continuous, possess derivatives at all points, are non-decreasing and have output values limited to [−1,1]. In an alternate embodiment, a unipolar-sigmoid function or the tanh function could be used.

Before using the neural network to detect diseased tissues, the network must be trained using digital training images, representing regions of interests, and output images corresponding to the desired results. Regions of interest are extracted from digitized mammograms as described in U.S. Pat. No. 4,907,156. To train the system of FIG. 1A, a series of training images are used as inputs to the input layer and are received by the first hidden layer. The first hidden layer generates outputs which are used as inputs to the second hidden layer, and the second hidden layer generates outputs which are used as inputs to the output layer. A training error is calculated to determine the difference between the desired outputs and the actual outputs for each of the training images. The training error is calculated according to:

$$E = \sum_{k} \sum_{x,y} (T^k(x,y) - O^k(x,y))^2 \tag{3}$$

wherein $T^k(x,y)$ denotes the desired output and $O^k(x,y)$ denotes the actual output of the neural network for the training input image k. Using this error function, the connection weights between groups are modified according to a modified error back propagation algorithm with the shift-invariant-connection constraint.

The training algorithm will now be described. To begin the training process of the neural network of the present invention, neuron connections are established to create receptive fields from a preceding layer to a neuron in a group in a succeeding layer, values are assigned to each of the connection weights so that the mean of the connection weights are constrained to be substantially zero. When using optional biases in the nonlinear function, these biases are also assigned to zero at the initial state. To mathematically state this training condition, let $W^l_{p,q}(x,y)$ indicate the connection weights, where l=(1,2, ... L), the layer number, p=(1,2 ... $P^l$), the group number in the lth layer and q=(1,2 ... $P^{l+1}$), the group number in the (l+1)th layer, wherein:

$$\sum_{x,y} W^l_{p,q}(x,y) = 0 \tag{4}$$

This constraint is used because, when processing input images, the low spacial frequency components, especially the DC component, of a ROI are very large compared with the signals (or microcalcifications). If these constraints were not imposed, units in the second layer would be saturated by the low frequency background even if there are very small fractions of DC components in the kernels. Saturation would cause the training of the network to fail from the outset. On the other hand, by using the zero-mean-weight constraint, all the DC components are filtered out, and only the high spacial frequency components in the ROIs contribute the activities of the neurons in the subsequent layers.

A back-propagation algorithm with a generalized delta rule was used to train the neural network, and the bipolar sigmoid-like function was used as the activation function for each processing unit in the neural network. In the training process, the internal parameters of the connections between layers (including threshold values of each unit) are adjusted iteratively so that the difference between the output values and the desired results is minimized. This can be accomplished by the following rule:

$$\Delta W^l_{p,q}(x,y) = \eta\, \delta^{l+1}_q(x,y) * O^l_p(x,y) + \alpha W^l_{p,q}(x,y) \tag{5}$$

$$\Delta b_p^l = \eta \sum_i \sum_j \delta_p^l(x,y) + \alpha b_p^l \tag{6}$$

$$\delta_p^l(x,y) = f'(N_p^l(x,y) + b_p^l) \sum_q [\delta^{l+1}_q(x,y) *^- W^l_{p,q}(x,y)] \tag{7}$$

$$^-W^l_{p,q}(x,y) = W^l_{p,q}(-x, -y) \tag{8}$$

and in the case of the output layer, $$\delta_i^L(x,y) = f'(N(x,y) + b_p^l)[T^L(x,y) - O_i^L(x,y)], \tag{9}$$

where: $N^L_p(x,y)$ is an input of the unit at the location (x,y), $W^l_{p,q}(x,y)$ is the connection weights to location (x,y), $O^l_p(x,y)$ is an output of the unit at (x,y), the f(x) is a thresholding function, f'(x) is a derivative of f(x), $\Delta W^l_{p,q}(x,y)$ is a change of the connection weight, $\Delta b^l_p$ is a change in a bias and "*" is the convolutional operator.

Figure 5A:
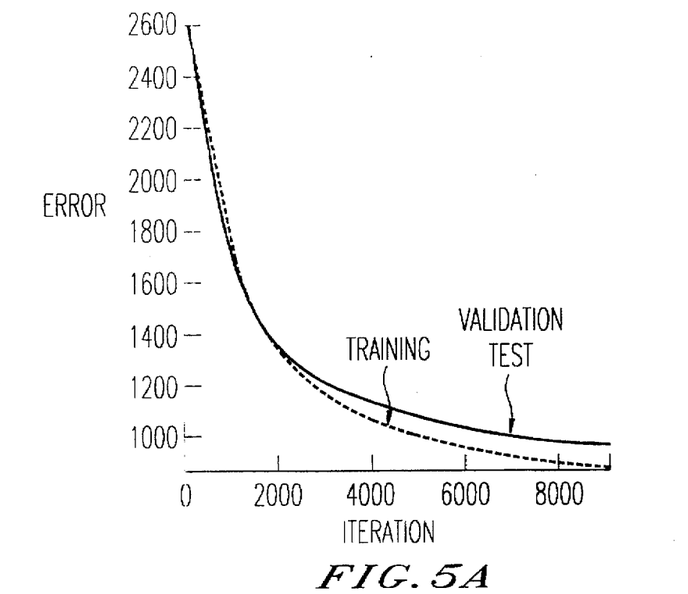
FIG. 5A is a graph showing the training error of the neural network as it is trained using a set of training images and desired outputs, using between zero and 10,000 training iterations, and the resulting error that occurs during a validation test using a correspondingly trained network and testing images different from the training images.
Figure 5B:
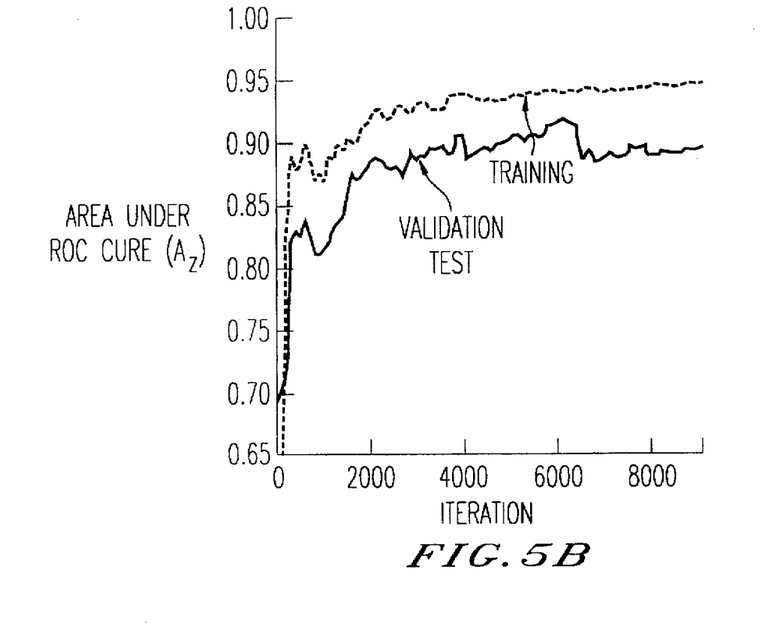
FIG. 5B is a graph showing the area under a receiver operating characteristic (ROC) curve, $A_z$, while training a network using the same images as for the system of FIG. 5A, using zero to 10,000 iterations, and the corresponding error which results from each network during the validation test.
Figure 6:
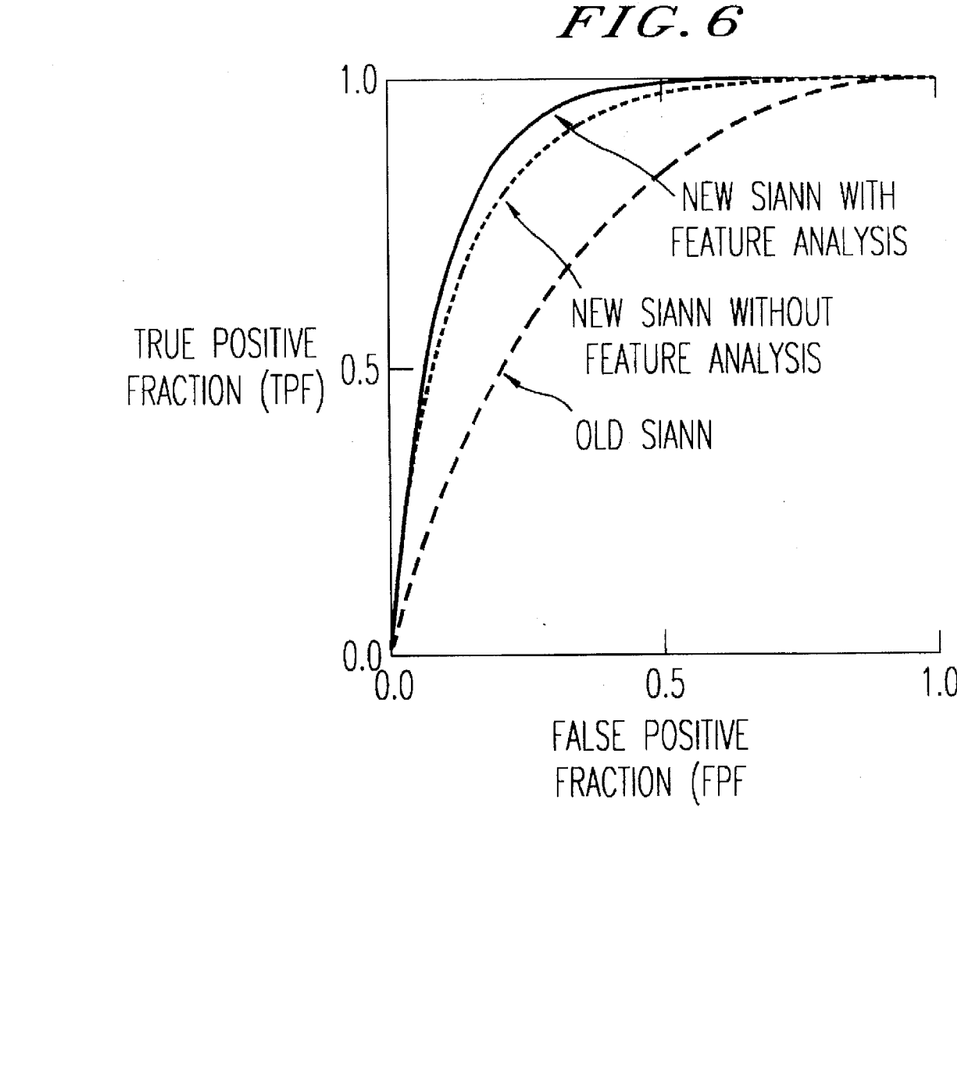
FIG. 6 is a graph depicting the resulting ROC curves for a system using background-trend correction and pixel-value normalization before inputting the image data to an SIANN, a SIANN which is trained using training-free zones and an SIANN with feature analysis which is trained using training-free zones.

As an illustration example of a neural network and its initial conditions for the connection weights, in the embodiment of the present invention, for which FIGS. 5A–6 show results, a network includes an input layer, a first hidden layer with two groups, a second hidden layer with one group and an output layer, wherein all weights of each 7×7 kernel starts with zero-mean random values between −0.3 and 0.3, with all biases initially assigned to zero. The grey-level signals of the input images from regions of interest range across a predetermined set of values, i.e., from zero to 1023, and the grey-levels were reduced by a predetermined factor in the input layer to avoid saturations of the units in the second layer. Additionally, in the illustrated example, the learning rate, η, was 0.1 and the constant factor of the moment term, α, was 0.9.

As described above, a training iteration of the neural network comprises the steps of inputting a training image into the input layer and calculating a training error for the selected image based on the desired outputs. Based on the training error, the connection weights of each unit are modified according to the modified error back propagation method. This process is repeated for each training image. Multiple training iterations are used including, often thousands or tens of thousands of iterations, until a training error falls below desired value. In an alternate embodiment of the present invention, the training iterations are continued until the area under the receiver operating characteristics curve falls significantly as compared to previous iterations. This decrease in area ($A_z$) under the ROC curve indicates an over-training of the network, and the values of the weights for the maximum $A_z$ are used as the final values for the trained network.

Figures 2A, 2B, 2C:
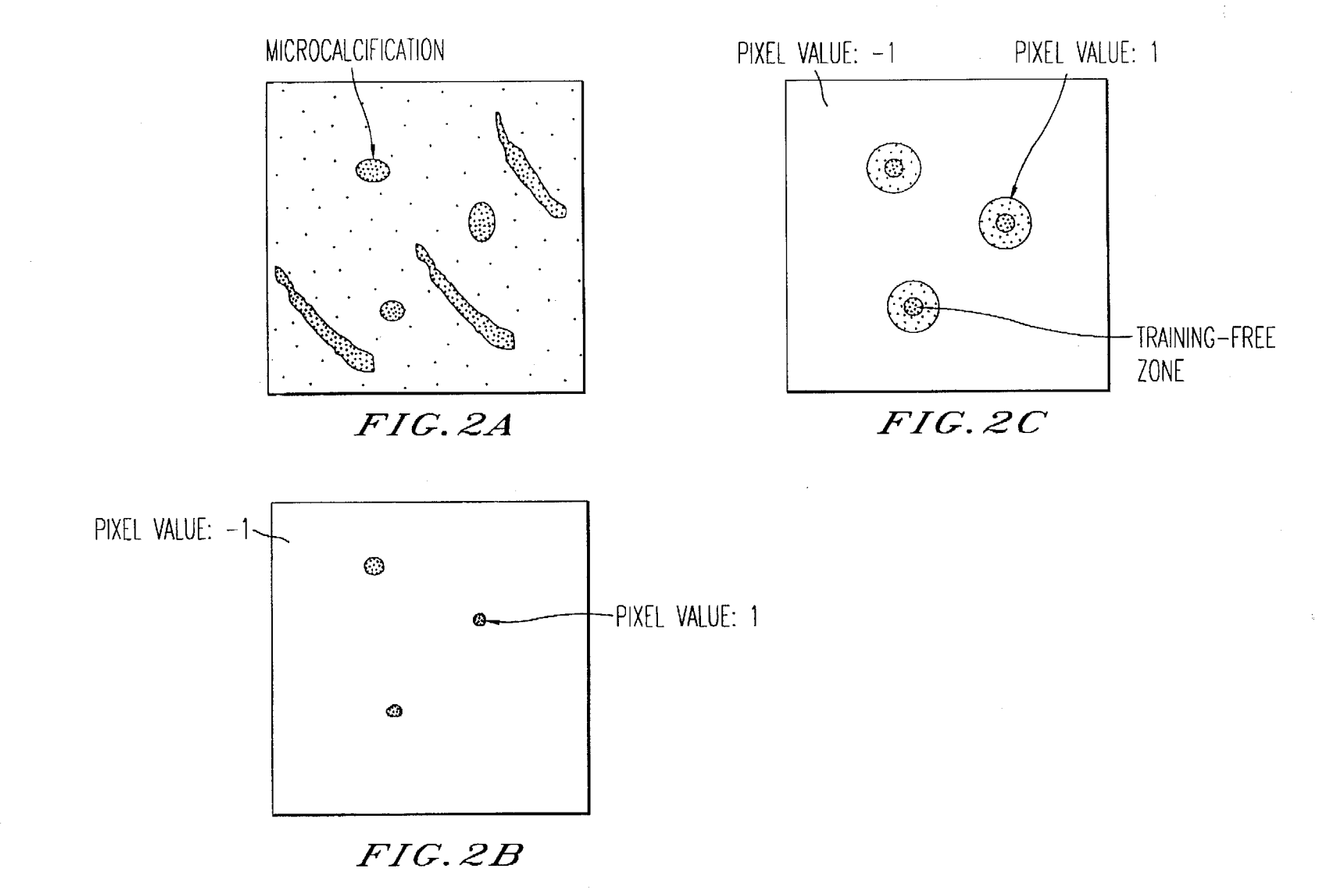
FIGS. 2A, 2B and 2C are pictures of an original region of interest, and a corresponding desired output from a first embodiment of the invention during a training process and a second desired output from a second embodiment of the invention, wherein some areas of the training image are excluded from training as belonging to a training-free zone.

FIG. 2A shows a region of interest to be analyzed according to the present invention, wherein three microcalcifications are shown along with three blood vessel which ideally should not be identified as microcalcifications.

FIG. 2A was obtained by digitizing conventional screen-film (Kodak Min R/OM) mammograms using a Fuji drum scanner system with a pixel size of 0.1×0.1 mm². The optical density in the range from 0.2 to 2.75 was linearly quantized to 10-bit gray scales, although other various densities and quantization could be used. In a preferred embodiment of the present invention, this digitization process, or bes equivalent, can be used to generate the digital mammograms which are analyzed for regions of interest. For example, digital mammograms obtained from a Fuji Computed Radiography system can be used for generating training and testing images for the SIANN.

In a first embodiment of the present invention, as shown in FIG. 2B, all points in the training image are used when calculating a desired output. In the second embodiment of the present invention, as shown in FIG. 2C, the pixel values equal to 1 and −1 are used in training, but the surrounding pixel values inside the second circle, labelled "training-free zone", are not used when calculating the training error.

Figure 3:
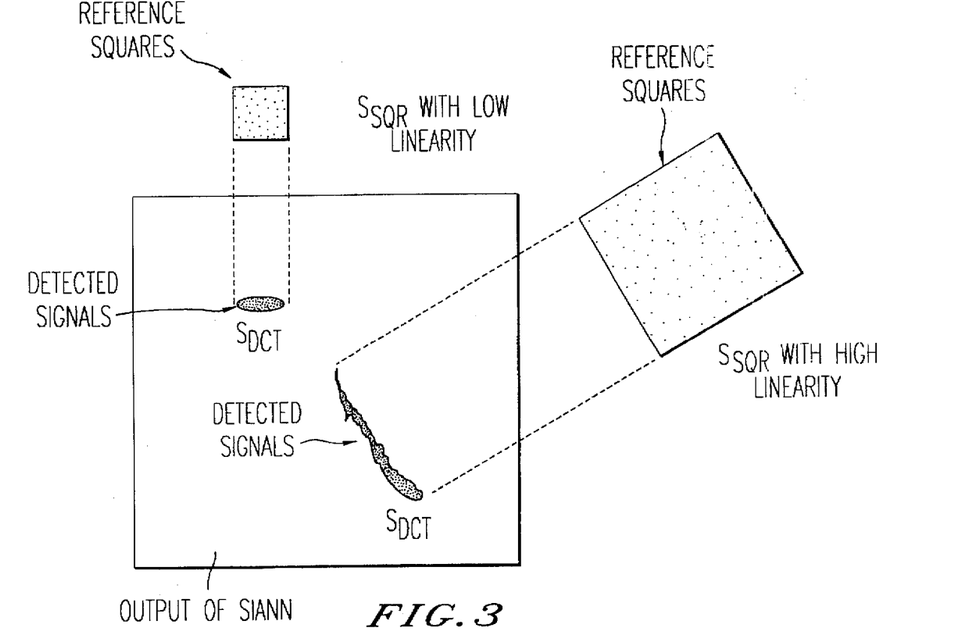
FIG. 3 is a schematic illustration of how the linearity of a detected object is determined according to one aspect of the present invention.

Turning now to an analysis of the use of system of the first embodiment, the network is trained using the method described above which does not include training-free zones. After training, an input image is applied to the trained neural network, and a resulting output image is created, as shown in FIG. 3. This output of the shift-invariant artificial neural network is applied to a classification system to determine the number of clustered microcalcifications in the region of interest image. To determine the number of microcalcifications, the output of the shift-invariant neural network is first thresholded to yield a binary image corresponding to the threshold pixel value chosen. The borders of regions greater than the threshold pixel value, or "white" regions in the binary output image are then traced using a four-conductivity-region growing technique. Once the borders are traced, "white" regions are segmented from each other. Each isolated "white" region is considered as a candidate region which, according to its characteristics, may or may not be a detected microcalcification. To avoid detecting blood vessels as microcalcifications, the area and linearity of each individual candidate region is calculated. The area of each candidate region is defined as the total number of pixels within the white area, with areas of two or less pixels being eliminated from the candidate regions as noise or artifacts.

Secondly, the linearity index (LS) of each candidate region is defined as:

$$LS = 1 - \frac{S_{det}}{S_{sqr}} \tag{10}$$

where $S_{det}$ is the area of a candidate region and $S_{sqr}$ is the area of a square for which the length of the square's sides are equal to the longest axis of the candidate region. FIG. 3 shows candidate regions with high and low linearities such that candidate regions with high linearity and large areas are due to vessels, and candidate regions with low linearities are likely to be microcalcifications. As an illustrative example of typical values that can be used in a system of the present invention, in tests the false detection threshold was set at an area of more than 100 pixels or a linearity index greater than 0.75. Although these values were determined experimentally, obvious modifications can be made to detect other diseases or structures without departing from the scope and spirit of the present invention.

After the candidate regions are eliminated by using the area and linearity criteria, the total number of remaining candidate regions in each region of interest is counted. If the number of remaining candidate regions in the output image is equal to or greater than a predetermined number, such as two, the input region of interest is considered a positive ROI, otherwise the ROI is considered a negative ROI.

Furthermore, to provide an optimal threshold used to yield a binary image before classification, true-positive fraction (TPF) and the false-positive fraction (FPF) of the classification resulting from the trained SIANN were calculated at various threshold pixel values, while the other criteria were fixed. ROC curves were obtained by fitting the TPF and FPF data using ROCFIT program developed by Metz et al as disclosed in "Current problems in ROC analysis," PROC. Chest Imaging Conference, (W. W. Peppler and A. A. Alter, EDS.) Madison, Wis., 315–336 (1988). The optimal threshold pixel value was determined empirically based on the result of the ROC analysis obtained from the various threshold pixel values.

In the second embodiment of the present invention, the training algorithm of the SIANN is modified to include the training-free zones, as shown in FIG. 2C. In contrast to the method of the first embodiment wherein the output of a unit in the output layer is one only if the corresponding unit and the input layer is at the center of a microcalcification, as shown in FIG. 2B, the training-free zones established around the center of each microcalcification exclude these regions from the training process. This causes the SIANN to remain responsive to the structure of detected regions and enables the SIANN to produce the same outputs for microcalcifications that differ in size and shape. Thus, the output of the SIANN is very likely to extract the shapes of the microcalcifications, which are then used in post-processing for eliminating false-positive detections using the area and linearity criteria. Furthermore, the training-free zone technique reduces training time by calculating fewer error values during the training process. As the training process may take thousands or tens of thousands of iterations, this is a substantial savings in training time. Training-free zones can be established depending on the size and shape of the area to be ignored and are not to be construed as limited by the illustrative examples. However, in the embodiment of the invention for which FIGS. 5A-6 were generated, the training-free zones were circular and nine pixels in diameter.

Figure 4:
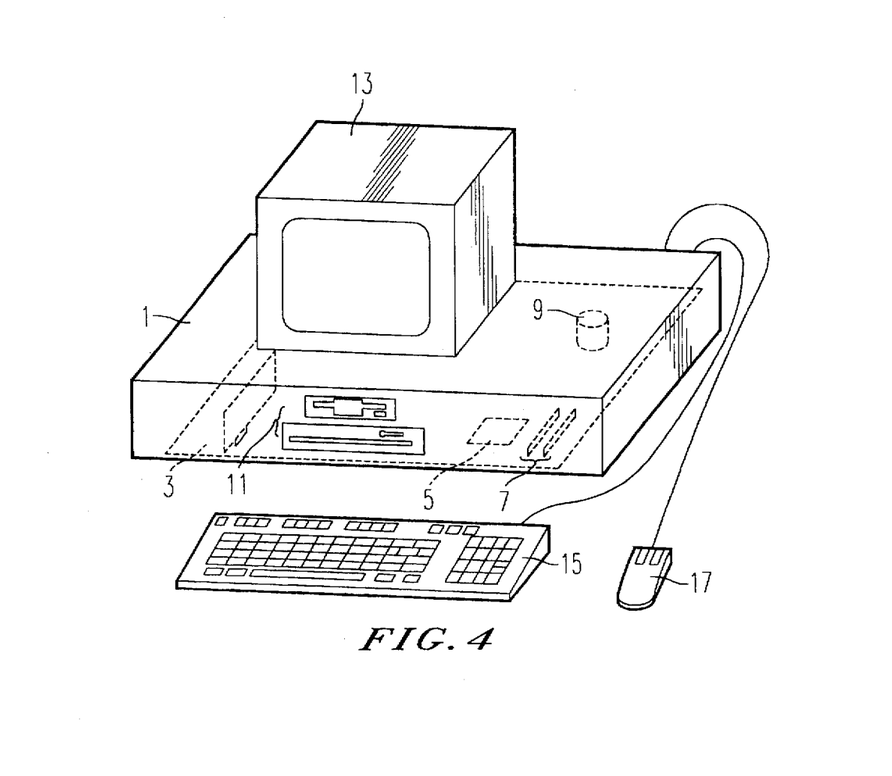
FIG. 4 is a schematic illustration of a computer system for implementing the method of the present invention.

As shown in FIG. 4, one embodiment of the present invention may be implemented using a general purpose computer 1 which includes a mother-board 3 which houses a central processing unit 5 and memory 7. Furthermore, the mother-board 3 connects to a fixed media, high density storage device 9 as well as removable storage devices 11 (i.e., floppy drives and compact disc readers). To enable the operator of the general purpose computer 1 to see the images which result from the present method, the computer system 1 is connected to a computer monitor 13. Normal inputs to the system are also provided (i.e., keyboard 15 and mouse 17) to enable a user to select centers for microcalcifications during the training process or for selecting training free zones when using the second training method.

Not only can the computer 1 of FIG. 4 be used to implement a neural network using the processing unit 5 and memory 7, the computer 1 can train the computer-implemented neural network and additionally calculate and display training error based on the number of iterations applied to the neural network during the training process.

An analysis of the accuracy of the different techniques has been made which shows that the present invention improves over the rule-based scheme and the rule-based scheme combined with the old SIANN. In the first 39 mammogram set, a total of 69 clusters were reported by the rule-based scheme. Among them were 35 true clusters and 34 false-positive clusters. Some of the large true clusters (21 out of 35) were divided into two ROIs because the ROI size was relatively small. Each of the positive ROIs contained at least 3 microcalcifications. fifty-six positive ROIs of 49×49 pixels (about 4.9×4.9 mm$^2$) were visually selected around the centers of the detected true clusters. In the case of false-positive clusters, a total of 136 negative ROIs of 49×49 pixels (four per each false-positive cluster) were selected around the centers of detected clusters. Among these ROIs, 31 positive ROIs and 75 negative ROIs were randomly selected for the training group, and the remaining 25 positive and 61 negative ROIs were used for the validation group.

In the second 50-mammogram set, a total of 35 true-positive clusters and 72 false-positive clusters were reported by the rule-based scheme, and 107 ROIs of 145×145 pixels (about 14.5×14.5 mm$^2$) were selected around the centers of the detections and used for the testing set of the SIANN. By using larger ROIs, the test conditions matched real world conditions more closely because microcalcification clusters are often larger than 4.9×4.9 mm$^2$. In addition, by using the larger ROIs, it has been shown that the SIANN of the present invention can deal with ROIs of different size from the size used in training. In the previous SIANN technique, the performance of the SIANN was degraded because of the background-trend-correction process if the ROIs had different sizes than used in training, especially when the sizes were larger.

As shown in FIG. 5A, the accuracy of the neural network can be tested using a cross-validation technique which aids in determining whether a neural network has been over-trained. FIG. 5A shows that the training error between training iterations decreases substantially as the number of iterations increases until 2000 iterations have been performed. The training error then decreases less rapidly between 2000 and 8000 iterations, with substantial errors still existing at 8000 iterations. This indicates that the neural network is still changing its weighting factors internally, but this does not guarantee that the changes are productive. By contrast, FIG. 5B shows that the training and validation performed using 2000 iterations gives an $A_z$ value of 0.82 and at 6000 iterations gives 0.90. However, after 6000 iterations, the $A_z$ value indicates that the training actually decreases the efficiency/accuracy of the neural network. Therefore, the preferred connection weights should be chosen as the weights when $A_z$ is a maximum, i.e., chosen as the weights at 6000 training iterations.

To show the usefulness of the present invention, FIG. 6 shows the ROC curve for the prior art SIANN system which used ROIs which were first preprocessed with background-trend correction and pixel-value normalization before being entered into an SIANN, the ROC curve as obtained by the SIANN of the present system without using feature analysis and the ROC curve of the new SIANN using training free zones and feature analysis. The areas under the ROC curves where 0.90, 0.88 and 0.74, respectively. As is shown in Table I, the present invention reduces the number of false-positives detected as compared to the previous SIANNs. As can be seen in Table I, about 62% of false-positive ROIs identified by the rule-based scheme can be eliminated with the new SIANN without any loss of true-positive ROIs. With the previous SIANN, however, only about 21% of false-positive ROIs can be eliminated while preserving all the true-positive ROIs.

TABLE 1

|  | Loss of true-positive cluster | Elimination of false-positive cluster |
| --- | --- | --- |
| Old SIANN | 0 (0.0%) | 11 (21%) |
|  | 1 (1.4%) | 15 (23%) |
| New SIANN without feature analysis | 0 (0.0%) | 34 (48%) |
|  | 1 (1.4%) | 45 (63%) |
| New SIANN with feature analysis | 0 (0.0%) | 44 (62%) |
|  | 1 (1.4%) | 48 (68%) |

Table II shows the comparison of the areas under the ROC curves of the SIANNs for the test data set with different ROI sizes. Both the new SIANN and the previous SIANN were trained with ROIs of size 49×49 pixels and obtained good performance (0.91 and 0.92, respectively) for the test data set with the same ROI size. However, the performance of the previous SIANN decreases rapidly with the increase of the ROI size because of the degradation of the background-trend correction. As the ROI becomes large, the slight decrease in the performance of the new SIANN occurs due to the increased probability of producing a false-positive cluster.

TABLE 2

| SIANN/ROI Size | 49 × 49 | 97 × 97 | 145 × 145 |
| --- | --- | --- | --- |
| New | 0.90 | 0.89 | 0.88 |
| Old | 0.91 | 0.83 | 0.74 |

Figure 7:
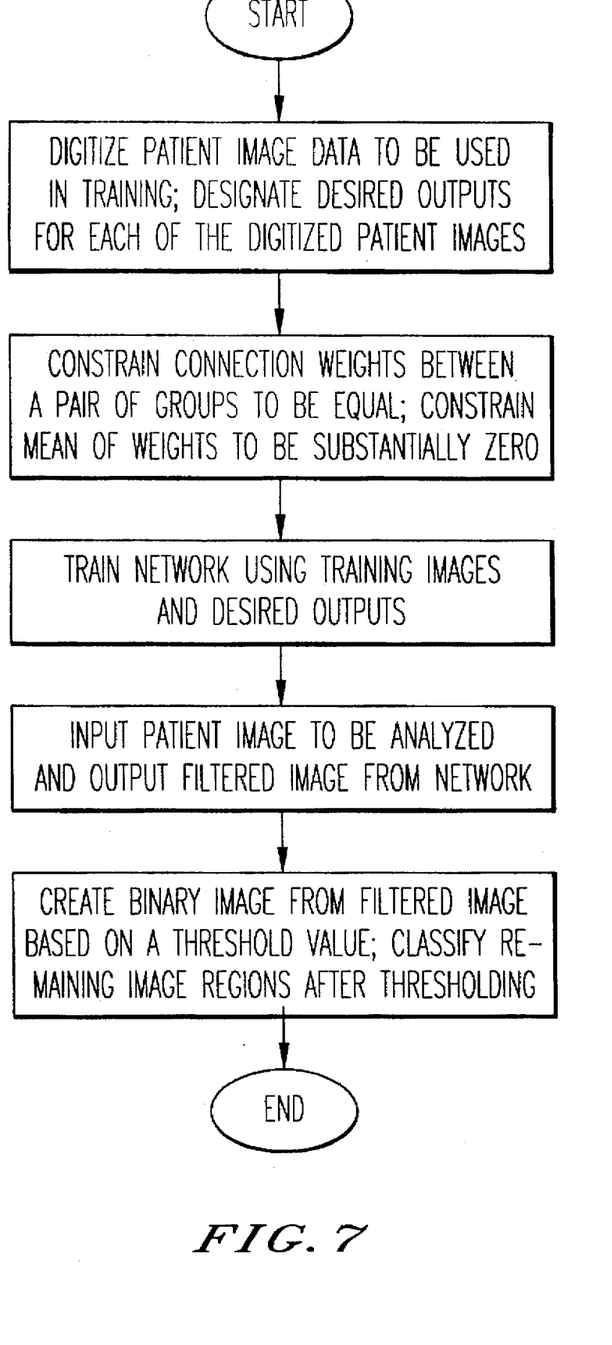
FIG. 7 is a flowchart showing the overall method of training a SIANN and using the SIANN to detect healthy versus diseased tissue.
Figure 8:
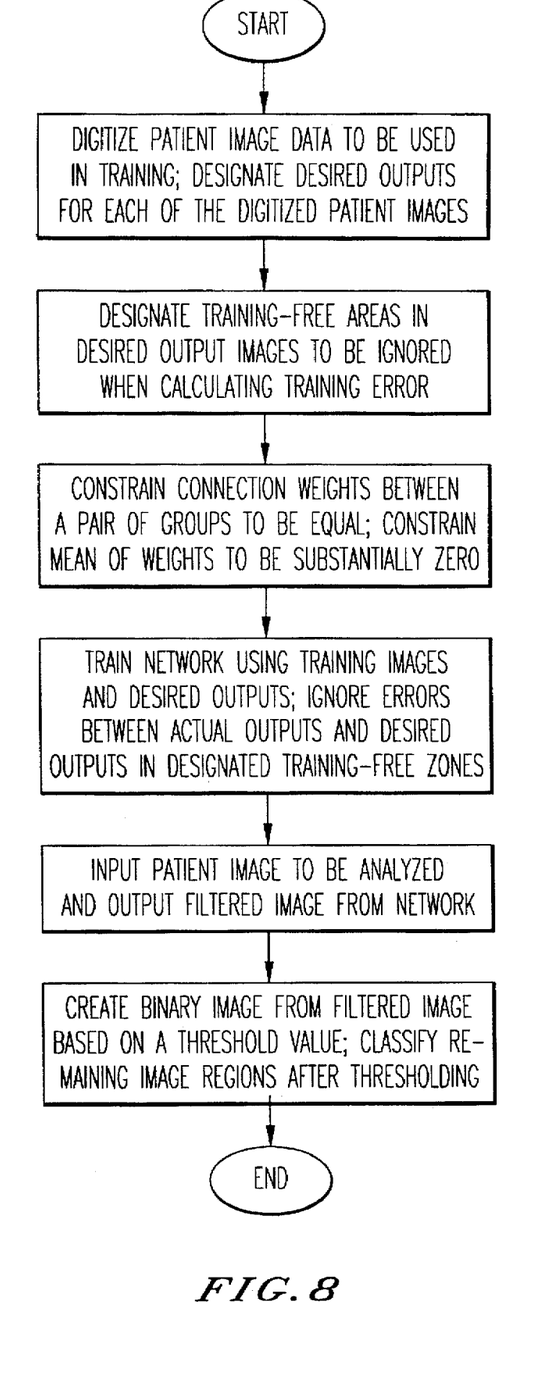
FIG. 8 is a flowchart showing the overall method of training a SIANN and using the SIANN to detect healthy versus diseased tissue wherein the training uses training free zones.

Lastly, FIGS. 7 and 8 show the general method of the present invention with and without using training-free zones, but obviously, numerous modifications and variations of the present invention are possible in light of the above teachings. It is therefore to be understood that within the scope of the amended appended claims, the invention may be practiced otherwise than as specifically described herein.

What is claimed as new and desired to be secured by Letters Patent of the United States is:

1. A method for detecting diseased tissue using a shift-invariant artificial neural network (SIANN) including an input layer, an output layer, and at least one hidden layer, the output layer including at least one output unit, each hidden layer of the at least one hidden layer including at least one group and each group including at least one hidden unit, wherein the input layer is connected to a first hidden layer of said at least one hidden layer, and the output layer is connected to a last hidden layer of said at least one hidden layer, and wherein each output unit of said at least one output unit and each hidden unit of said at least one hidden unit in the SIANN receives at least one set of plural weighted inputs from a corresponding preceding layer, the method comprising the steps of:

obtaining plural digitized training medical images;

extracting plural training regions of interest from the plural digitized training medical images;

converting the plural training regions of interest into numerical data;

assigning values to each input of said at least one set of plural weighted inputs so that for each set of said at least one set of plural weighted inputs a sum of all of said values in said each set is substantially zero;

training the SIANN using the numerical data and plural corresponding desired outputs;

obtaining a digitized patient medical image to be analyzed; and detecting diseased tissue using the trained SIANN and the digitized patient medical image.

2. The method of claim 1, wherein the step of detecting diseased tissue comprises the steps of:

selecting a patient region of interest from the digitized patient medical image;

converting the patient region of interest into patient numerical data;

inputting the patient numerical data into the trained SIANN;

outputting a filtered image at the output layer; and classifying the filtered image as representing diseased tissue or normal tissue based on the filtered image.

3. The method as claimed in claim 2, wherein the classifying step comprises:

thresholding the filtered image to yield a binary image based on a threshold pixel value;

tracing regions in the binary image determined to be greater than the threshold pixel value in the thresholding step;

discarding noise regions from the traced regions to identify candidate regions; and classifying the filtered image as representing diseased tissue or normal tissue based on the candidate regions.

4. The method according to claim 3, wherein the step of classifying the filtered image based on the candidate regions comprises:

calculating an area of each of the candidate regions;

eliminating from the candidate regions any candidate region with a calculated area greater than an area threshold to identify remaining candidate regions;

classifying the filtered image as representing diseased tissue or normal tissue based on the remaining candidate regions.

5. The method according to claim 4, wherein the step of classifying the filtered image as representing diseased tissue or normal tissue based on the remaining candidate regions comprises:

calculating for each of the remaining candidate regions, an area of a square with an edge length corresponding to a respective longest axis of each remaining candidate region;

calculating a linearity index for each of said remaining candidate regions based on the areas of the remaining candidate regions and the areas of the squares;

eliminating from the remaining candidate regions any of the remaining candidate regions having a linearity index greater than a linearity threshold to identify non-linear candidate regions; and classifying the filtered image as representing diseased tissue or normal tissue based on the non-linear candidate regions.

6. The method according to claim 5, wherein the step of eliminating from the remaining candidate regions comprises:

eliminating from the remaining candidate regions any of the remaining candidate regions having a linearity index greater than 0.75.

7. The method according to claim 4, wherein the step of classifying the filtered image as representing diseased tissue or normal tissue based on the remaining candidate regions comprises:

classifying the filtered image as an image representing diseased tissue if a number of remaining candidate region is greater than a predetermined threshold.

8. The method according to claim 4, wherein the step of classifying the filtered image as representing diseased tissue or normal tissue based on the remaining candidate regions comprises:

setting a classification threshold on two remaining candidate regions; and classifying the filtered image as an image representing diseased tissue if a number of remaining candidate regions is greater than the classification threshold.

9. The method according to claim 4, wherein the eliminating step comprises:

eliminating from the candidate regions any candidate region with a calculated area greater than 100 pixels.

10. The method according to claim 3, wherein the tracing step comprises:

tracing regions in the binary image using a four-connectivity region growing technique.

11. The method according to claim 3, wherein the discarding step comprises:

setting a minimum area threshold;

calculating an area of each of the traced regions;

discarding as a noise region any of the traced regions with a calculated area less than the minimum area threshold; and identifying as a candidate region any traced region not discarded as a noise region.

12. The method according to claim 11, wherein the step of setting a minimum area threshold comprises:

setting a minimum area threshold to two pixels.

13. The method according to claim 2, wherein the step of converting the patient regions of interest comprises:

converting the patient regions of interest into 10-bit gray-levels; and scaling down the 10-bit gray-levels by a factor of one-hundred.

14. The method according to claim 1, wherein the training step comprises:

training the SIANN using an error back propagation training method.

15. The method according to claim 1, wherein the training step comprises:

using −0.9 and 0.9 as convergence targets of −1 and 1;

using a learning rate, $\eta$, of 0.1; and using a constant factor of a moment term, $\alpha$, of 0.9.

16. The method according to claim 1, wherein the training step comprises:

training the SIANN iteratively, until a training error falls below a training error threshold.

17. The method according to claim 1, wherein the training step comprises:

training the SIANN iteratively, until an area, $A_z$, under a receiver operating characteristic (ROC) curve reaches a global maximum and begins to decrease; and reverting the values of each input of said at least one set of plural weighted inputs to their corresponding values when the area, $A_z$, under the ROC curve was the global maximum.

18. The method according to claim 1, further comprising the step of:

building the SIANN before the assigning step so that there are two hidden layers, with a first of the two hidden layers including two hidden groups and a second of the two hidden layers including one hidden group.

19. The method according to claim 1, wherein the converting step comprises:

converting the plural training regions of interest into 10-bit gray-levels; and scaling down the 10-bit gray-levels by a factor of one-hundred.

20. The method according to claim 1, wherein the assigning step comprises:

assigning values to each input of said at least one set of plural weighted inputs of the SIANN so that each of said units of the SIANN receives inputs from a 7×7 region of a corresponding preceding layer.

21. A method for detecting diseased tissue using a shift-invariant artificial neural network (SIANN) including an input layer, an output layer, and at least one hidden, the output layer-including at least one output unit, each hidden layer of at least one hidden layer including at least one group and each group including at least one hidden unit, wherein the input layer is connected to a first hidden layer of said at least one hidden layer, and the output layer is connected to a last hidden layer of said at least one hidden layer, and wherein each output unit of the at least one output unit and each hidden unit of the at least one hidden unit in the SIANN receives at least one set of plural weighted inputs from a corresponding preceding layer, the method comprising the steps of:

obtaining plural digitized training medical images;

extracting plural training regions of interest from the plural digitized training medical images;

converting the plural training regions of interest into numerical data;

assigning values to each input of said at least one set of plural weighted inputs so that for each set of said at least one set of plural weighted inputs a sum of all of said values in said each set is substantially zero;

designating a training-free zone and plural desired outputs for each of the plural training regions of interest;

training the SIANN using the numerical data and the plural corresponding desired outputs;

obtaining a digitized patient medical image to be analyzed; and detecting diseased tissue using the trained SIANN and the digitized patient medical image.

22. The method of claim 21, wherein the step of detecting diseased tissue comprises the steps of:

selecting a patient region of interest from the digitized patient medical image;

converting the patient region of interest into patient numerical data;

inputting the patient numerical data into the trained SIANN;

outputting a filtered image at the output layer; and classifying the filtered image as representing diseased tissue or normal tissue based on the filtered image.

23. The method as claimed in claim 22, wherein the classifying step comprises:

thresholding the filtered image to yield a binary image based on a threshold pixel value;

tracing regions in the binary image determined to be greater than the threshold pixel value in the thresholding step;

discarding noise regions from the traced regions to identify candidate regions; and classifying the filtered image as representing diseased tissue or normal tissue based on the candidate regions.

24. The method according to claim 23, wherein the step of classifying the filtered image based on the candidate regions comprises:

calculating an area of each of the candidate regions;

eliminating from the candidate regions any candidate region with a calculated area greater than an area threshold to identify remaining candidate regions;

classifying the filtered image as representing diseased tissue or normal tissue based on the remaining candidate regions.

25. The method according to claim 24, wherein the step of classifying the filtered image as representing diseased tissue or normal tissue, based on the remaining candidate regions comprises:

calculating for each of the remaining candidate regions, an area of a square with an edge length corresponding to a respective longest axis of each remaining candidate region;

calculating a linearity index for each of said remaining candidate regions based on the areas of the remaining candidate regions and the areas of the squares;

eliminating from the remaining candidate regions any of the remaining candidate regions having a linearity index greater than a linearity threshold to identify non-linear candidate regions; and classifying the filtered image as representing diseased tissue or normal tissue based on the non-linear candidate regions.

26. The method according to claim 25, wherein the step of eliminating from the remaining candidate regions comprises:

eliminating from the remaining candidate regions any of the remaining candidate regions having a linearity index greater than 0.75.

27. The method according to claim 24, wherein the step of classifying the filtered image as representing diseased tissue or normal tissue based on the remaining candidate regions comprises:

classifying the filtered image as an image representing diseased tissue if a number of remaining candidate region is greater than a predetermined threshold.

28. The method according to claim 24, wherein the step of classifying the filtered image as representing diseased tissue or normal tissue based on the remaining candidate regions comprises:

setting a classification threshold to two remaining candidate regions; and classifying the filtered image as an image representing diseased tissue if a number of remaining candidate regions is greater than the classification threshold.

29. The method according to claim 24, wherein the eliminating step comprises:

eliminating from the candidate regions any candidate region with a calculated area greater than 100 pixels.

30. The method according to claim 23, wherein the tracing step comprises:

tracing regions in the binary output image using a four-connectivity region growing technique.

31. The method according to claim 23, wherein the discarding step comprises:

setting a minimum area threshold;

calculating an area of each of the traced regions;

discarding as a noise region any of the traced regions with a calculated area less than the minimum area threshold; and identifying as a candidate region any traced region not discarded as a noise region.

32. The method according to claim 31, wherein the step of setting a minimum area threshold comprises:

setting a minimum area threshold to two pixels.

33. The method according to claim 21, wherein the assigning step comprises:

assigning values to each input of said at least one set of plural weighted inputs of the SIANN so that each of said units of the SIANN receives inputs from a 7×7 region of a corresponding preceding layer.

34. The method according to claim 21, wherein the training step comprises:

training the SIANN using an error back propagation training method.

35. The method according to claim 21, wherein the training step comprises:

using −0.9 and 0.9 as convergence targets of −1 and 1;
using a learning rate, η, of 0.1; and
using a constant factor of a moment term, α, of 0.9.

36. The method according to claim 21, wherein the training step comprises:

training the SIANN iteratively, until the training error falls below a training error threshold.

37. The method according to claim 21, wherein the training step comprises:

training the SIANN iteratively, until an area, $A_z$, under a receiver operating characteristic (ROC) curve reaches a global maximum and begins to decrease; and reverting the values of each input of said at least one set of plural weighted inputs to their corresponding values when the area, $A_z$, under the ROC curve was the global maximum.

38. The method according to claim 21, further comprising the step of:

building the SIANN before the assigning step so that there are two hidden layers, with a first of the two hidden layers including two hidden groups and a second of the two hidden layers including one hidden group.

39. The method according to claim 21, wherein the converting step comprises:

converting the plural training regions of interest into 10-bit gray-levels; and scaling down the 10-bit gray-levels by a factor of one-hundred.

40. The method according to claim 21, wherein the step of converting the patient regions of interest comprises:

converting the patient regions of interest into 10-bit gray-levels; and scaling down the 10-bit gray-levels by a factor of one-hundred.

41. The method according to claim 21, wherein the designating step comprises:

designating a circular training-free zone with a nine pixel diameter centered about a center of a microcalcification.

42. A method for training a shift-invariant artificial neural network (SIANN) to detect diseased tissue, wherein the SIANN includes an input layer, an output layer, and at least one hidden layer, the output layer including at least one output unit, each hidden layer of the at least one hidden layer including at least one group and each group including at least one hidden unit, wherein the input layer is connected to a first hidden layer of said at least one hidden layer, and the output layer is connected to a last hidden layer of said at least one hidden layer, and wherein each output unit of said at least one output unit and each hidden unit of said at least one hidden unit in the SIANN receives at least one set of plural weighted inputs from a corresponding preceding layer, the method comprising the steps of:

obtaining plural digitized training medical images;

extracting plural training regions of interest from the plural digitized training medical images;

converting the plural training regions of interest into numerical data;

assigning values to each input of said at least one set of plural weighted inputs so that for each set of said at least one set of plural weighted inputs a sum of all of said values in said each set is substantially zero; and training the SIANN using the numerical data and plural corresponding desired outputs.

43. A method for training a shift-invariant artificial neural network (SIANN) to detect diseased tissue, wherein the SIANN includes an input layer, an output layer, and at least one hidden layer, the output layer including at least one output unit, each hidden layer including at least one group and each group including at least one hidden unit, wherein the input layer is connected to a first hidden layer of said at least one hidden layer, and the output layer is connected to a last hidden layer of said at least one hidden layer, and wherein each output unit of the at least one output unit and each hidden unit of the at least one hidden unit in the SIANN receives at least one set of plural weighted inputs from a corresponding preceding layer;

obtaining plural digitized training medical images;

extracting plural training regions of interest from the plural digitized training medical images;

converting the plural training regions of interest into numerical data;

assigning values to each input of said at least one set of plural weighted inputs so that for each set of said at least one set of plural weighted inputs a sum of all of said values in said each set is substantially zero;

designating a training-free zone and plural desired outputs for each of the plural training regions of interest; and training the SIANN using the numerical data and the plural corresponding desired outputs.

44. A system for detecting diseased tissue, comprising:

a shift-invariant artificial neural network (SIANN) including an input layer, an output layer, and at least one hidden layer, the output layer including at least one output unit, each hidden layer of the at least one hidden layer including at least one group, and each group including at least one hidden unit, wherein the input layer is connected to a first hidden layer of said at least one hidden layer, and the output layer is connected to a last hidden layer of said at least one hidden layer, and wherein each output unit of said at least one output unit and each hidden unit of said at least one hidden unit in the SIANN receives at least one set of plural weighted inputs from a corresponding preceding layer;

means for obtaining plural digitized training medical images;

means for extracting plural training regions of interest from the plural digitized training medical images;

means for converting the plural training regions of interest into numerical data;

means for assigning values to each input of said at least one set of plural weighted inputs so that for each set of said at least one set of plural weighted inputs a sum of all of said values in said each set is substantially zero;

means for training the SIANN using the numerical data and plural corresponding desired outputs;

means for obtaining a digitized patient medical image to be analyzed; and means for detecting diseased tissue using the trained SIANN and the digitized patient medical image.

45. The system of claim 44, wherein the means for detecting diseased tissue comprises:

means for selecting a patient region of interest from the digitized patient medical image;

means for converting the patient region of interest into patient numerical data;

means for inputting the patient numerical data into the trained SIANN;

means for outputting a filtered image at the output layer; and means for classifying the filtered image as representing diseased tissue or normal tissue based on the filtered image.

46. The system as claimed in claim 45, wherein the means for classifying comprises:

means for thresholding the filtered image to yield a binary image based on a threshold pixel value;

means for tracing regions in the binary image determined to be greater than the threshold pixel value used by the means for thresholding;

means for discarding noise regions from the traced regions to identify candidate regions; and means for classifying the filtered image as representing diseased tissue or normal tissue based on the candidate regions.

47. The system according to claim 46, wherein the means for classifying the filtered image based on the candidate regions comprises:

means for calculating an area of each of the candidate regions;

means for eliminating from the candidate regions any candidate region with a calculated area greater than an area threshold to identify remaining candidate regions; and means for classifying the filtered image as representing diseased tissue or normal tissue based on the remaining candidate regions.

48. The system according to claim 47, wherein the means for classifying the filtered image based on the remaining candidate regions comprises:

means for calculating for each of the remaining candidate regions an area of a square with an edge length corresponding to a respective longest axis of each remaining candidate region;

means for calculating a linearity index for each of the remaining candidate regions based on the areas of the remaining candidate regions and the areas of the corresponding squares;

means for eliminating from the remaining candidate regions any of the remaining candidate regions having a linearity index greater than a linearity threshold to identify non-linear candidate regions; and means for classifying the filtered image as representing diseased tissue or normal tissue based on the non-linear candidate regions.

49. The system according to claim 48, wherein the means for eliminating from the remaining candidate regions comprises:

means for eliminating from the remaining candidate regions any of the remaining candidate regions having a linearity index greater than 0.75.

50. The system according to claim 47, wherein the means for classifying the filtered image based on the remaining candidate regions comprises:

means for classifying the filtered image as an image representing diseased tissue if a number of remaining candidate regions is greater than a predetermined threshold.

51. The system according to claim 47, wherein the means for classifying the filtered image based on the remaining candidate regions comprises:

means for setting a classification threshold to two remaining candidate regions; and means for classifying the filtered image as an image representing diseased tissue if a number of remaining candidate regions is greater than the classification threshold.

52. The system according to claim 47, wherein the means for eliminating comprises:

means for eliminating from the candidate regions any candidate region with a calculated area greater than 100 pixels.

53. The system according to claim 46, wherein the means for tracing comprises:

means for tracing regions in the binary output image using a four-connectivity region growing technique.

54. The system according to claim 46, wherein the means for discarding comprises:

means for setting a minimum area threshold;

means for calculating an area of each of the traced regions;

means for discarding as a noise region any of the traced regions with a calculated area less than the minimum area threshold; and means for identifying as a candidate region any traced region not discarded as a noise region.

55. The system according to claim 54, wherein the means for setting a minimum area threshold comprises:

means for setting a minimum area threshold to two pixels.

56. The system according to claim 45, wherein the means for converting the patient regions of interest comprises:

means for converting the patient regions of interest into 10-bit gray-levels; and means for scaling down the 10-bit gray-levels by a factor of one-hundred.

57. The system according to claim 44, wherein the means for training comprises:

means for training the SIANN using an error back propagation training method.

58. The system according to claim 44, wherein the means for training comprises:

means for using −0.9 and 0.9 as convergence targets of −1 and 1;

means for using a learning rate, $\eta$, of 0.1; and means for using a constant factor of a moment term, $\alpha$, of 0.9.

59. The system according to claim 44, wherein the means for training comprises:

means for training the SIANN iteratively, until a training error falls below a training error threshold.

60. The system according to claim 44, wherein the means for training comprises:

means for training the SIANN iteratively, until an area, $A_z$, under a receiver operating characteristic (ROC) curve reaches a global maximum and begins to decrease; and means for reverting the values of each of the plural weighted inputs to their corresponding values when the area, $A_z$, under the ROC curve was the global maximum.

61. The system according to claim 44, further comprising:

means for building the SIANN before the means for assigning assigns values so that there are two hidden layers, with a first of the two hidden layers including two hidden groups and a second of the two hidden layers including one hidden group.

62. The system according to claim 44, wherein the means for converting comprises:

means for converting the plural training regions of interest into 10-bit gray-levels; and means for scaling down the 10-bit gray-levels by a factor of one-hundred.

63. The system according to claim 44, wherein the means for assigning comprises:

means for assigning values to each input of said at least one set of plural weighted inputs of the SIANN so that each of said units of the SIANN receives inputs from a 7×7 region of a corresponding preceding layer.

64. A system for detecting diseased tissue, comprising: a shift-invariant artificial neural network (SIANN) including an input layer, an output layer, and at least one hidden layer, the output layer including at least one output unit, each hidden layer of the at least one hidden layer including at least one group, and each group including at least one hidden unit, wherein the input layer is connected to a first hidden layer of said at least one hidden layer, and the output layer is connected to a last hidden layer of said at least one hidden layer, and wherein each output unit of the at least one output unit and each hidden unit of the at least one hidden unit in the SIANN receives at least one set of plural weighted inputs from a corresponding preceding layer;

means for obtaining plural digitized training medical images;

means for extracting plural training regions of interest from the plural digitized training medical images;

means for converting the plural training regions of interest into numerical data;

means for assigning values to each input of said at least one set of plural weighted inputs so that for each set of said at least one set of plural weighted inputs a sum of all of said values in said each set is substantially zero;

means for designating a training-free zone and plural desired outputs for each of the plural training regions of interest;

means for training the SIANN using the numerical data and the plural corresponding desired outputs;

means for obtaining a digitized patient medical image to be analyzed; and means for detecting diseased tissue using the trained SIANN and the digitized patient medical image.

65. The system of claim 64, wherein the means for detecting diseased tissue comprises:

means for selecting a patient region of interest from the digitized patient medical image;

means for converting the patient region of interest into patient numerical data;

means for inputting the patient numerical data into the trained SIANN;

means for outputting a filtered image at the output layer; and means for classifying the filtered image as representing diseased tissue or normal tissue based on the filtered image.

66. The system as claimed in claim 65, wherein the means for classifying comprises:

means for thresholding the filtered image to yield a binary image based on a threshold pixel value;

means for tracing regions in the binary image determined to be greater than the threshold pixel value used by the means for thresholding;

means for discarding noise regions from the traced regions to identify candidate regions; and means for classifying the filtered image as representing diseased tissue or normal tissue based on the candidate regions.

67. The system according to claim 66, wherein the means for classifying the filtered image based on the candidate regions comprises:

means for calculating an area of each of the candidate regions;

means for eliminating from the candidate regions any candidate region with a calculated area greater than an area threshold to identify remaining candidate regions; and means for classifying the filtered image as representing diseased tissue or normal tissue based on the remaining candidate regions.

68. The system according to claim 67, wherein the means for classifying the filtered image based on the remaining candidate regions comprises:

means for calculating for each of the remaining candidate regions an area of a square with an edge length corresponding to a respective longest axis of each remaining candidate region;

means for calculating a linearity index for each of the remaining candidate regions based on the areas of the remaining candidate regions and the areas of the corresponding squares;

means for eliminating from the remaining candidate regions any of the remaining candidate regions having a linearity index greater than a linearity threshold to identify non-linear candidate regions; and means for classifying the filtered image as representing diseased tissue or normal tissue based on the non-linear candidate regions.

69. The system according to claim 68, wherein the means for eliminating from the remaining candidate regions comprises:

means for eliminating from the remaining candidate regions any of the remaining candidate regions having a linearity index greater than 0.75.

70. The system according to claim 67, wherein the means for classifying the filtered image based on the remaining candidate regions comprises:

means for classifying the filtered image as an image representing diseased tissue if a number of remaining candidate regions is greater than a predetermined threshold.

71. The system according to claim 67, wherein the means for classifying the filtered image based on the remaining candidate regions comprises:

means for setting a classification threshold to two remaining candidate regions; and means for classifying the filtered image as an image representing diseased tissue if a number of remaining candidate regions is greater than the classification threshold.

72. The system according to claim 67, wherein the means for eliminating comprises:

means for eliminating from the candidate regions any candidate region with a calculated area greater than 100 pixels.

73. The system according to claim 66, wherein the means for tracing comprises:

means for tracing regions in the binary output image using a four-connectivity region growing technique.

74. The system according to claim 66, wherein the means for discarding comprises:

means for setting a minimum area threshold;

means for calculating an area of each of the traced regions;

means for discarding as a noise region any of the traced regions with a calculated area less than the minimum area threshold; and means for identifying as a candidate region any traced region not discarded as a noise region.

75. The system according to claim 74, wherein the means for setting a minimum area threshold comprises:

means for setting a minimum area threshold to two pixels.

76. The system according to claim 65, wherein the means for converting the patient regions of interest comprises:

means for converting the patient regions of interest into 10-bit gray-levels; and means for scaling down the 10-bit gray-levels by a factor of one-hundred.

77. The system according to claim 64, wherein the means for training comprises:

means for training the SIANN using an error back propagation training method.

78. The system according to claim 64, wherein the means for training comprises:

means for using −0.9 and 0.9 as convergence targets of −1 and 1;

means for using a learning rate, $\eta$, of 0.1; and means for using a constant factor of a moment term, $\alpha$, of 0.9.

79. The system according to claim 64, wherein the means for training comprises:

means for training the SIANN iteratively, until a training error falls below a training error threshold.

80. The system according to claim 64, wherein the means for training comprises:

means for training the SIANN iteratively, until an area, $A_z$, under a receiver operating characteristic (ROC) curve reaches a global maximum and begins to decrease; and means for reverting the values of each of the plural weighted inputs to their corresponding values when the area, $A_z$, under the ROC curve was the global maximum.

81. The system according to claim 64, further comprising:

means for building the SIANN before the means for assigning assigns values so that there are two hidden layers, with a first of the two hidden layers including two hidden groups and a second of the two hidden layers including one hidden group.

82. The system according to claim 64, wherein the means for converting comprises:

means for converting the plural training regions of interest into 10-bit gray-levels; and means for scaling down the 10-bit gray-levels by a factor of one-hundred.

83. The system according to claim 64, wherein the means for designating comprises:

means for designating a circular training-free zone with a nine pixel diameter centered about a center of a microcalcification.

84. The system according to claim 64, wherein the means for assigning comprises:

means for assigning values to each input of said at least one set of plural weighted inputs of the SIANN so that each of said units of the SIANN receives inputs from a 7×7 region of a corresponding preceding layer.

85. A system for training a shift-invariant artificial neural network (SIANN) to detect diseased tissue, the system comprising:

a SIANN including an input layer, an output layer, and at least one hidden layer, the output layer including at least one output unit, each hidden layer of the at least one hidden layer including at least one group and each group including at least one hidden unit, wherein the input layer is connected to a first hidden layer of said at least one hidden layer, and the output layer is connected to a last hidden layer of said at least one hidden layer, and wherein each output unit of said at least one output unit and each hidden unit of said at least one hidden unit in the SIANN receives at least one set of plural weighted inputs from a corresponding preceding layer;

means for obtaining plural digitized training medical images;

means for extracting plural training regions of interest from the plural digitized training medical images;

means for converting the plural training regions of interest into numerical data;

means for assigning values to each input of said at least one plural weighted inputs so that for each set of said at least one set of plural weighted inputs a sum of all of said values in said each set is substantially zero;

means for designating a training-free zone and plural desired outputs for each of the plural training regions of interest; and means for training the SIANN using the numerical data and the plural corresponding desired outputs.

86. A system for training a shift-invariant artificial neural network (SIANN) to detect diseased tissue, the system comprising:

a SIANN including an input layer, an output layer, and at least one hidden layer, the output layer including at least one output unit, each hidden layer of the at least one hidden layer including at least one group and each group including at least one hidden unit, wherein the input layer is connected to a first hidden layer of said at least one hidden layer, and the output layer is connected to a last hidden layer of said at least one hidden layer, and wherein each output unit of said at least one output unit and each hidden unit of the at least one hidden unit in the SIANN receives at least one set of plural weighted inputs from a corresponding preceding layer;

means for obtaining plural digitized training medical images;

means for extracting plural training regions of interest from the plural digitized training medical images;

means for converting the plural training regions of interest into numerical data;

means for assigning values to each input of said at least one plural weighted inputs so that for each set of said at least one set of plural weighted inputs a sum of all of said values in said each set is substantially zero; and means for training the SIANN using the numerical data and plural corresponding desired outputs.

87. A computer program product, comprising:

a computer storage medium and a computer program code mechanism embedded in the computer storage medium for causing a computer to train a shift-invariant artificial neural network (SIANN) to detect diseased tissue, the computer program code mechanism comprising:

a first computer code device configured to generate a SIANN includes an input layer, an output layer, and at least one hidden layer, the output layer including at least one output unit, each hidden layer of the at least one hidden layer including at least one group and each group including at least one hidden unit, wherein the input layer is connected to a first hidden layer of said at least one hidden layer, and output layer is connected to a last hidden layer of said at least one hidden layer, and wherein each output unit of said at least one output unit and each hidden unit of said at least one hidden unit in the SIANN receives at least one set of plural weighted inputs from a corresponding preceding layer;

a second computer code device configured to obtain plural digitized training medical images;

a third computer code device configured to extract plural training regions of interest from the plural digitized training medical images;

a fourth computer code device configured to convert the plural training regions of interest into numerical data;

a fifth computer code device configured to assign values to each input of said at least one set of plural weighted inputs so that for each set of said at least one set of plural weighted inputs a sum of all of said values in said each set is substantially zero; and a sixth computer code device configured to train the SIANN using the numerical data and plural corresponding desired outputs.

88. The computer program product as claimed in claim 87, further comprising:

a seventh computer code device configured to obtain a digitized patient medical image to be analyzed; and an eighth computer code device configured to detect diseased tissue using the trained SIANN and the digitized patient medical image.

89. The computer program product as claimed in claim 87, further comprising:

a seventh computer code device configured to designate a training-free zone in at least one of the plural training regions of interest.

90. The computer program product as claimed in claim 87, further comprising:

a seventh computer code device configured to obtain a digitized patient medical image to be analyzed;

an eighth computer code device configured to detect diseased tissue using the trained SIANN and the digitized patient medical image; and a ninth computer code device configured to designate a training-free zone in at least one of the plural training regions of interest.

* * * * *